United States Patent

[11] 3,586,339

| [72] | Inventor | Peter Demuth<br>Karlsruhe, Germany |
|---|---|---|
| [21] | Appl. No. | 848,568 |
| [22] | Filed | Aug. 8, 1969 |
| [45] | Patented | June 22, 1971 |
| [73] | Assignee | Daimler-Benz Aktiengesellschaft<br>Stuttgart-Unterturkheim, Germany |
| [32] | Priority | Aug. 8, 1968 |
| [33] | | Germany |
| [31] | | P 17 51 853.5 |

[54] PISTON RING FOR INTERNAL COMBUSTION ENGINES
5 Claims, 1 Drawing Fig.

[52] U.S. Cl. .................................................. 277/235R

[51] Int. Cl. ................................................ F16j 15/16
[50] Field of Search.... ......................... 277/235, 235 A; 23/252 A, 117/105, 131

[56] References Cited
UNITED STATES PATENTS

| 2,905,512 | 9/1959 | Anderson | 277/235 (A) |
| 3,378,392 | 4/1968 | Longo | 117/105 |

Primary Examiner—Robert I. Smith
Attorney—Craig, Antonelli, Stewart & Hill

ABSTRACT: A piston ring for internal combustion engines consisting of a base material such as steel or the like which is provided with a bearing layer essentially consisting of tantalum.

PATENTED JUN 22 1971  3,586,339
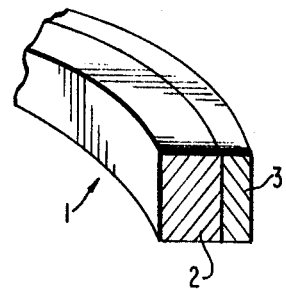
INVENTOR
PETER DEMUTH
BY
Craig, Antonelli, Stewart & Hill
ATTORNEYS

PISTON RING FOR INTERNAL COMBUSTION ENGINES

The present invention relates to a piston ring for internal combustion engines which consists of a base material and is provided with a bearing or contact layer.

As material for the bearing or contact layer of piston rings are used essentially chromium, tungsten, or molybdenum. These materials however, entail different disadvantages. Thus, molybdenum and especially chromium have relatively low melting points whereas tungsten not only involves a high price but also causes a stronger wear of the cylinder walls than, for example, chromium.

The aim underlying the present invention resides in making the bearing or contact layer from a material which does not possess the aforementioned disadvantages. The underlying problems are solved according to the present invention in that the bearing or contact layer consists of tantalum. This material has a considerably higher melting point compared to chromium and molybdenum so that the piston rings are capable of withstanding also highest thermal loads, as occur in particular with high-power or heavy duty internal combustion engines. This advantage is achieved without having to utilize the tungsten which is higher in cost.

The bearing or contact layer of tantalum is advantageously sprayed onto the base material. Any known spray installation of conventional construction may be used for that purpose. However, it is also possible to apply the running or contact layer on the base material by galvanic process.

Accordingly, it is an object of the present invention to provide a piston ring for internal combustion engines which avoids by simple means the aforementioned shortcomings and drawbacks encountered in the prior art.

Another object of the present invention resides in a piston ring for internal combustion engines which has improved qualities for its intended purposes without substantial increase in cost.

A further object of the present invention resides in a piston ring for internal combustion engine which is capable of withstanding maximum thermal loads without causing excessive wear in the cylinder walls.

These and further objects, features, and advantages of the present invention will become more obvious from the following description when taken in connection with the accompanying drawing which shows, for purposes of illustration only, one embodiment in accordance with the present invention, and wherein:

The single FIGURE is a partial perspective view of a piston ring in accordance with the present invention cut open to illustrate the details thereof.

Referring now to the single FIGURE of the drawing, a piston ring generally designated by reference numeral 1 is shown in cross section as an embodiment of the present invention. The piston ring 1 has a substantially rectangular cross section. The base material 2 located on the radially inner side consists, for example, of steel, especially of spheroidal graphite iron. A contact or bearing layer 3 of tantalum is applied onto the outer edge of the base material 2 which may be sprayed on with the aid of a conventional spray installation.

While I have shown and described only one embodiment in accordance with the present invention, it is understood that the same is not limited thereto but is susceptible of numerous changes and modifications as known to those skilled in the art. For example, the invention is not limited to the shape of the piston ring 1 illustrated in FIGURE 1 but may be applied equally to piston rings, for example, of trapezoidal or double-trapezoidal shape. Thus, it is obvious that the present invention can be modified in numerous ways, and I therefore do not wish to be limited to the details shown and described herein but intend to cover all such changes and modifications as are within the scope of those skilled in the art.

I claim:

1. A piston ring for internal combustion engines which essentially consist of a base material and is provided with a bearing layer, characterized in that the bearing layer essentially consists of tantalum.

2. A piston ring according to claim 1, characterized in that the bearing layer of tantalum is sprayed onto the base material.

3. A piston ring according to claim 1, characterized in that the bearing layer of tantalum is applied onto the base material by galvanic process.

4. A piston ring for internal combustion engines according to claim 1, characterized in that the base material is steel.

5. A piston ring according to claim 1, characterized in that the base material is spheroidal graphite iron.